Dec. 14, 1948.    B. VALE    2,456,345
GARDEN HAND TOOL FOR SOIL CULTIVATION
Filed July 26, 1947
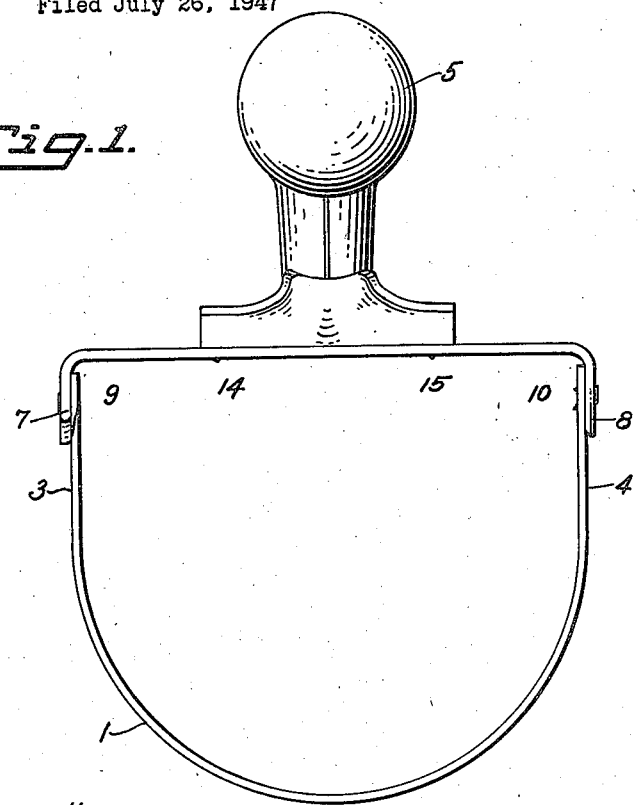
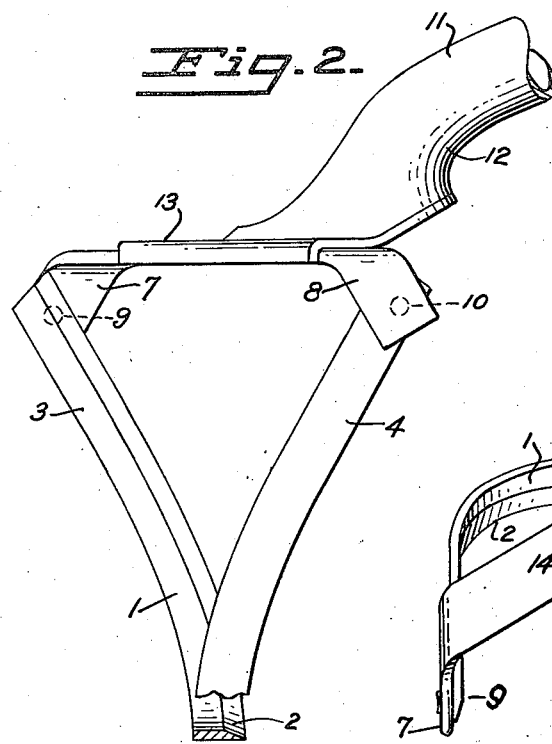
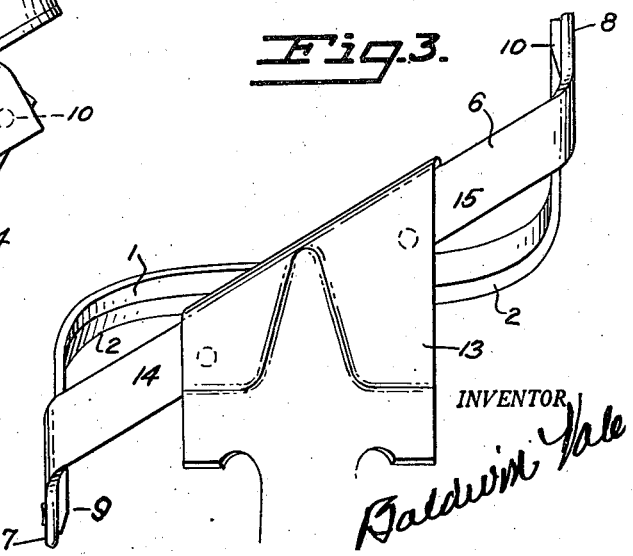
INVENTOR
Baldwin Vale Patented Dec. 14, 1948

2,456,345

UNITED STATES PATENT OFFICE 2,456,345

GARDEN HAND TOOL FOR SOIL CULTIVATION

Baldwin Vale, San Francisco, Calif.

Application July 26, 1947, Serial No. 763,831

3 Claims. (Cl. 97—65)

This invention relates to garden tools and more particularly to a garden hand tool for soil cultivation.

Among the objects of the invention is the provision of a garden tool that will accomplish maximum results with the minimum of effort.

Another object is the provision of such a tool that will crumble the soil to the full depth and width of the tool without turning under the surface soil.

Another object is to increase the porosity of the soil for aeration and the absorption of moisture and fertilizer, without forming clods or hard subsurface strata.

Trowels, spades, forks and similar tools that have to be pushed into the soil, and then pried rearwardly to loosen the soil have a tendency to compact the soil at the point of fulcrum. They also require excessive physical effort by the user, for penetration of hard soil, and slow up action between strokes.

The present tool is pulled backwardly and shears its way into the soil, with relatively light wrist effort, with little change of posture by the user, and can be used with fast strokes with little lost time between strokes.

Other objects and advantages will appear as the description proceeds. In the specification and the accompanying drawings the invention is disclosed in its preferred form. But it is to be understood that it is not limited to this form; because it may be embodied in modifications within the spirit of the invention as defined in the claims following the description.

In the one sheet of drawings:

Fig. 1 is a rear elevation of a manual garden tool constructed in accordance with this invention.

Fig. 2 is a side elevation of the same, with the hand grip portion of the handle broken away.

Fig. 3 is a plan view of the same from above.

Reference is made to my Patent Number 2,212,136, issued August 20, 1940, for Subsoil tilling machines.

In detail the structure shown in Fig. 1, comprises the substantially helicoidal blade 1, having the beveled cutting edge 2 throughout its rear edge. The lower portion of the blade is preferably a true semicircle, having the separated parallel upward extensions 3, 4, extending tangentially to the periphery of the helix, in the forwardly and rearwardly directions, as in Fig. 2. The lower edge portion of the blade is substantially transverse to the axis of the handle 5, as in Fig. 3, which counteracts any tendency for the blade to lead laterally when pulled into the soil, until the upward extensions 3, 4, exert their stabilizing effect parallel with each other and the axis of the handle.

The ends of the blade are cross connected by the oblique back bar 6, having its ends 7, 8, bent at right angles to the plane of the bar, and fixed to the respective rear and forward ends of the blade. The ends of the blade and bar may be fixed together by spot welding, riveting or in any other suitable manner, as at 9, 10.

For manual comfort the handle portion 5, is preferably of hard wood turned to shape and inserted and fastened within the socket end of the metal portion of the handle 11. As shown this metal portion is preferably die formed of sheet metal, with the offset portion 12, which inclines the axis of the handle relatively to the axis of the helix and the blade at 2, Fig. 2. This clears the hand of the user from contact with weeds and gives a better control of the tool, by keeping the wrist and elbow of the user in substantial alinement, during the swing stroke from the shoulder.

The head 13, forming a continuation of the offset portion 12, is spot welded as at 14, 15 to the top of the bar 6 intermediate its length, or otherwise fixed thereto, and forming the tool into an integral whole.

The handle portion and the cross bar 6 may be combined in the form of a die casting in metal, plastic or other suitable material, into which the ends of the blade may be embedded as at 7, 8, for simplifying fabrication in large volume.

As shown, the smaller size will comfortably cut four inches wide and three to six inches deep, without undue wrist fatigue. The beveled edge 2 causes the blade to penetrate with comparatively little downward pressure, when pulled, into average garden soil.

For the larger truck garden sizes, the handle 5 may be made long enough for a standing posture of the user. The average gardener can comfortably cut a furrow slice nine or more inches wide and six inches deep, more or less depending upon the results desired.

Weeds can be severed below the surface easily, because of the angular shearing action of the helicoidal blade, as compared with a hoe or other straight blade. For tender surface growth, the tool may be laid upon its side and the shearing done by the extensions 3 or 4. This is advantageous in mulching close to growing plants, without danger to the root growth.

Cut lawn grass, chemical and other forms of loose fertilizer spread around shrubs, will gravitate into the soil when it is crumbled by this invention.

The particular merit of the helicoidal blade is due to the fact that the distance between the ends of the blade longitudinally is greater than the diameter of the lower curved portion, so there is no compressive action against the soil in its functioning. The slice is lifted upwards at the bottom 2, curved right and left by the sides of the blade 3, 4, so that a pulverizing stream line effect results. This also tends to grind the blade bevel, at 2, so that it is self sharpening in use. Hard sun baked soil can be pulverized by repeated strokes, until the desired depth is reached.

Having fully described this invention and its mode of operation, what is claimed and desired to secure by Letters Patent is:

1. A garden tool comprising a handle having a back bar with one of its ends extending forward of the other end; and a substantially helicoidal cutting blade with laterally separated ends extending forward and rearward of and fixed to the opposite ends of said back bar respectively.

2. A garden tool comprising a handle; a back bar on said handle oblique to the axis of said handle; and a helicoidal cutting blade having its ends fixed to the opposite ends of said back bar respectively.

3. A garden tool comprising a handle; a back bar having its central portion fixed to said handle oblique to the axis of said handle; and a helicoidal cutting blade having its ends fixed to the opposite ends of said back bar; whereby the front and rear ends of said blade are respectively forward and rearward of the juncture of said back bar and handle.

BALDWIN VALE.

REFERENCES CITED

The following references are of record in the file of this patent:

UNITED STATES PATENTS

| Number | Name | Date |
|---|---|---|
| 1,534,659 | Peet et al. | Apr. 21, 1925 |

FOREIGN PATENTS

| Number | Country | Date |
|---|---|---|
| 412,780 | Great Britain | July 5, 1934 |
| 340,893 | France | May 26, 1904 |